(12) United States Patent
Raats et al.

(10) Patent No.: US 12,221,198 B2
(45) Date of Patent: Feb. 11, 2025

(54) HYBRID MARINE PROPULSION SYSTEM

(71) Applicant: Discovery Energy, LLC, Kohler, WI (US)

(72) Inventors: Joseph Raats, Zevenbergen (NL); Isaac S. Frampton, Strattanville, PA (US)

(73) Assignee: Discovery Energy, LLC, Kohler, WI (US)

( * ) Notice: Subject to any disclaimer, the term of this patent is extended or adjusted under 35 U.S.C. 154(b) by 387 days.

(21) Appl. No.: 17/585,319

(22) Filed: Jan. 26, 2022

(65) Prior Publication Data

US 2022/0242541 A1 Aug. 4, 2022

Related U.S. Application Data

(60) Provisional application No. 63/145,289, filed on Feb. 3, 2021.

(51) Int. Cl.
*B63H 21/20* (2006.01)
*B63H 23/02* (2006.01)

(52) U.S. Cl.
CPC ............. *B63H 21/20* (2013.01); *B63H 23/02* (2013.01); *B63H 2021/205* (2013.01); *B63H 2023/0283* (2013.01)

(58) Field of Classification Search
CPC .. B63H 21/20; B63H 2021/205; B63H 23/02; B63H 2023/0283
See application file for complete search history.

(56) References Cited

U.S. PATENT DOCUMENTS

| | | | |
|---|---|---|---|
| 7,980,905 B2 | 7/2011 | Rembach et al. | |
| 8,062,081 B2 | 11/2011 | Barrett et al. | |
| 8,454,402 B1 * | 6/2013 | Arbuckle | B63H 21/21 440/86 |
| 8,690,616 B2 | 4/2014 | Grassi et al. | |
| 8,725,329 B1 | 5/2014 | Snyder et al. | |
| 8,994,214 B2 | 3/2015 | Apalenek et al. | |

(Continued)

FOREIGN PATENT DOCUMENTS

| | | |
|---|---|---|
| CN | 106853767 B | 2/2019 |
| DE | 102017105904 A1 | 9/2017 |

(Continued)

OTHER PUBLICATIONS

Extended European Search Report from European Patent Application No. 22154567.6, dated Jul. 4, 2022, 10 pages.

(Continued)

*Primary Examiner* — Stephen P Avila
(74) *Attorney, Agent, or Firm* — The Belles Group, P.C>

(57) ABSTRACT

A hybrid propulsion system for a marine vessel is described. The hybrid propulsion system includes a shaft coupled to a propeller, a planetary gear system configured to operate in a first configuration and a second configuration, and a motor-generator. The motor-generator is configured to selectively rotate with and provide torque to the shaft through the planetary gear system in the first configuration and to rotate independently from the shaft in the second configuration. The shaft extends from the propeller through the planetary gear system and the motor-generator to a torque producing device for the marine vessel.

20 Claims, 12 Drawing Sheets

(56) References Cited

U.S. PATENT DOCUMENTS

| | | |
|---|---|---|
| 9,586,666 B2 | 3/2017 | Hedlund |
| 9,705,357 B2 | 7/2017 | Apalenek et al. |
| 10,399,654 B2 | 9/2019 | Rembach |
| 2012/0329593 A1 | 12/2012 | Larrabee et al. |
| 2014/0364265 A1 | 12/2014 | Bentgen et al. |
| 2020/0062362 A1 | 2/2020 | Nakamura et al. |

FOREIGN PATENT DOCUMENTS

| | | |
|---|---|---|
| EP | 1100717 B1 | 3/2003 |
| EP | 1652712 A2 | 5/2006 |
| EP | 1337412 B1 | 11/2006 |
| GB | 2417378 B | 10/2007 |
| GB | 2447274 B | 5/2011 |
| KR | 20120140356 A | 12/2012 |
| KR | 20140097633 A | 8/2014 |
| SU | 1481144 A1 | 5/1989 |
| WO | 2020015965 A1 | 1/2020 |
| WO | 2020054217 A1 | 3/2020 |

OTHER PUBLICATIONS

"Beta Hybrid Propulsion," Beta Marine (pp. 1-4). Date Accessed: Jul. 4, 2020. https://betamarine.co.uk/he-hybrid-propulsion/.

\* cited by examiner

FIG. 12

HYBRID MARINE PROPULSION SYSTEM

CROSS REFERENCE TO PRIOR APPLICATIONS

This application claims priority benefit of Provisional Application No. 63/145,289, filed Feb. 3, 2021, which is hereby incorporated by reference in its entirety.

FIELD

The present application relates generally to a propulsion system for a marine vessel, specifically for a propulsion system incorporating multiple power elements capable of propelling the marine vessel.

BACKGROUND

A marine vessel may include a mechanical propulsion drive train between an engine and a propeller. The supply of electricity for the other systems on the marine vessel may be supplied by one or more separate generators. In other drive systems, rather than a mechanical drive train from the engine, the generators may provide electrical power to one or motors connected to one or more propellers. The following embodiments include improvements to a hybrid drive that includes both an electrical drive system and a mechanical drive system.

BRIEF DESCRIPTION OF THE DRAWINGS

Exemplary embodiments are described herein with reference to the following drawings, according to an exemplary embodiment.

DETAILED DESCRIPTION

Figure 1:
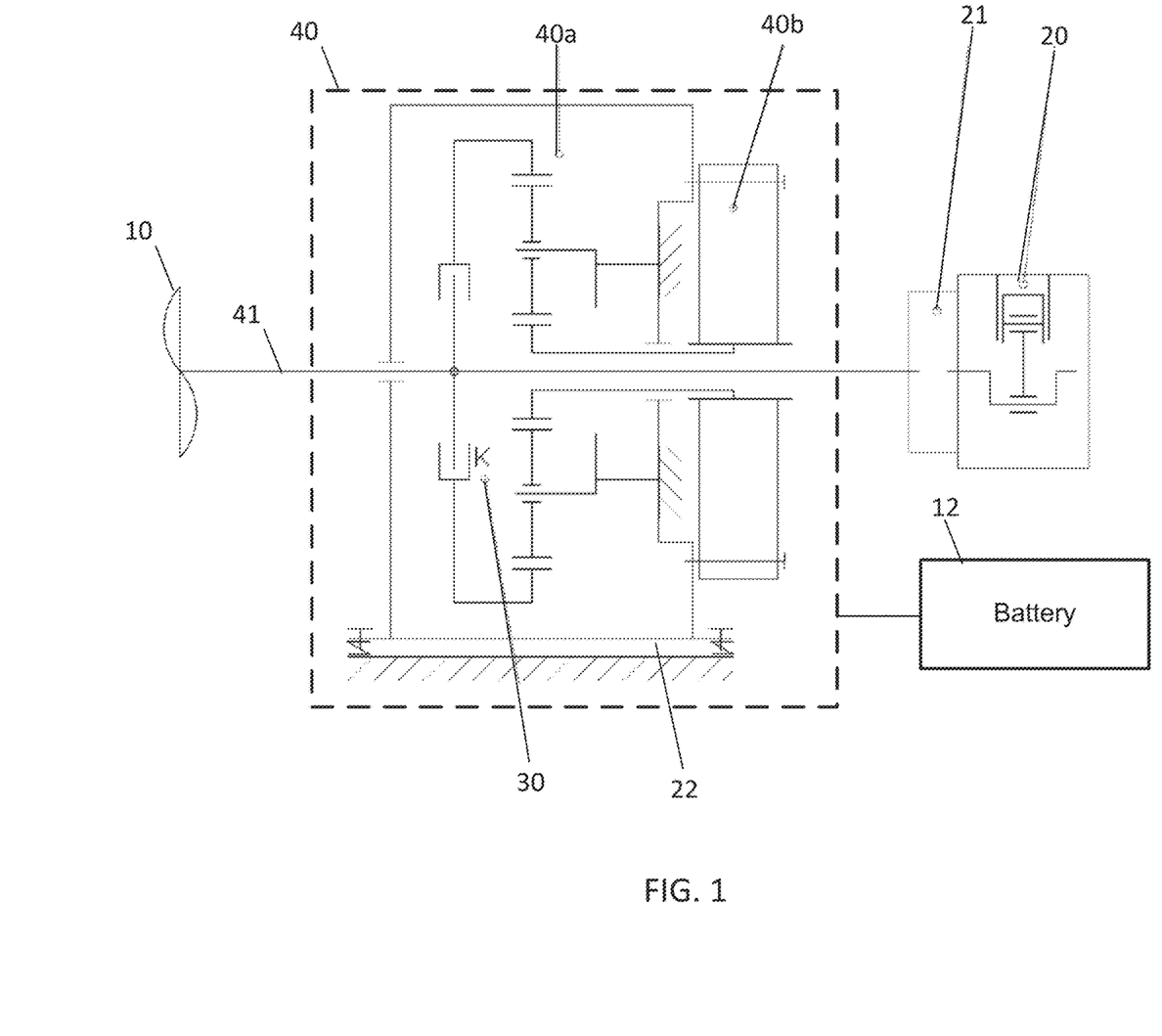
FIG. 1 illustrates a hybrid drive system for a marine vessel.

FIG. 1 illustrates a hybrid drive system for a marine vessel. The hybrid drive system provides torque to a mechanical load such as propeller 10. The hybrid drive system includes a shaft provided through an in-line hybrid drive assembly 40, and an engine 20. The in-line hybrid drive assembly 40 may be electrically connected to at least one battery 12. The engine 20 may be coupled to the shaft 41 via one or more transfer gears 21. Additional, different, or fewer components may be included.

The in-line hybrid drive assembly 40 includes a planetary gear system 40a and an electrical machine 40b. The electrical machine 40b may be an alternator and motor (e.g., motor-generator). The planetary gear system 40a may include a clutch 30 that can engage and disengage the electrical machine 40b from the shaft. The motor-generator is configured to selectively rotate with an engine and charge at least one battery in an engine propulsion configuration and configured to provide torque for the marine vessel through the planetary gear system in an electric drive configuration.

The electrical machine 40b, when operating as a generator may rotate a certain optimal speed that maximizes efficiency and/or power. An example optimal speed may be 2800 rpm. The optimal speed for the electrical machine 40b may depend on the construction of the generator or alternator. Fuel efficiency optimization may be achieved during hybrid operation stating that the system integral power management can be programmed to match the most optimum specific fuel consumption. For example, an electronic engine management system may report fuel consumption or associated optimal speed via bus communication (e.g., a controller area network or controller area network or CAN bus). Examples of optimal fuel consumption are described with reference to FIG. 10 below.

The propeller 10 may rotate a certain optimal propeller speed or speed selection of the propeller shaft. The optimal speed for the propeller 10 may depend on a characteristic of the propeller 10 and/or a characteristic of the marine vessel. Example characteristics of the propeller 10 include the weight of the propeller 10, a diameter of the propeller 10, a number of blades of the propeller 10, or a blade pitch of one or more blades. The characteristics of the marine vessel may include a length of the vessel, a weight of the vessel, or shape of the vessel. In some examples, the speed of the propeller shaft is driven by the hull design/shape and vessel application which are determining factors for the propeller design. The outcome results in a propeller torque speed curve which can vary from 700-1200 shaft rpm for planing hulls or as low as 60 rpm for large displacement freight carriers.

The planetary gear system 40a and the clutch 30 allow the engine 20 to drive the electrical machine 40b and the propeller 10 at different speeds at different times. Using a planetary gear system 40a with various optional speed ratios (e.g., 4.2:1) allows for the shaft speed to be increased to get close to its optimum power performance speed of the alternator and thus recharge the batteries 12 in the shortest possible time.

The clutch 30, which is normally not engaged, may include rotating multiple double-sided sintered discs that spline to a hub. Sandwiched between two discs may be a static steel plate that spline to the opposite member. The discs may be compressed by a piston which can move in a housing which has a cavity that can be filled by pressurized oil to move the piston and compress the sintered plates so the assembly becomes one instead of two separate components. A first hydraulic switch may be opened to release the pressurized oil to fill the cavity and actuate the piston and a second hydraulic switch may be opened to empty the cavity and retract the piston. That is, the planetary gear system 40a may include a mechanical driven oil pump that supplies the oil flow and pressure to the clutch 30 from and to the oil sump of the planetary gear system 40a.

The hybrid drive system is operable in multiple modes. In an engine propulsion mode with the engine 20 running and the reduction gear 21 engaged, the shaft 41 drives the electrical machine 40b to charge the batteries 12 by effectively using the available residual power from the engine 20.

During charging, the planetary gear clutch 30 is engaged. When the batteries 12 are charged the clutch 30 is disengaged to increase system efficiency.

In an electric drive mode, the reduction gear 21 has a neutral setting in which the engine 20 is uncoupled from the shaft 41. The engine 20 might be stopped to increase overall system efficiency. The electrical machine 40b (motor) drives the shaft 41 using electrical power from the battery 12. The planetary gear clutch 30 is engaged so that the electrical machine 40b drive the shaft 41 through the planetary gear system 40a. In the electrical drive mode, the hybrid drive system may achieve higher efficiency by uncoupling the engine 20 from the shaft 41. The transfer gear may include a neutral setting in which the engine 20 is uncoupled from the shaft 41.

Figure 2:
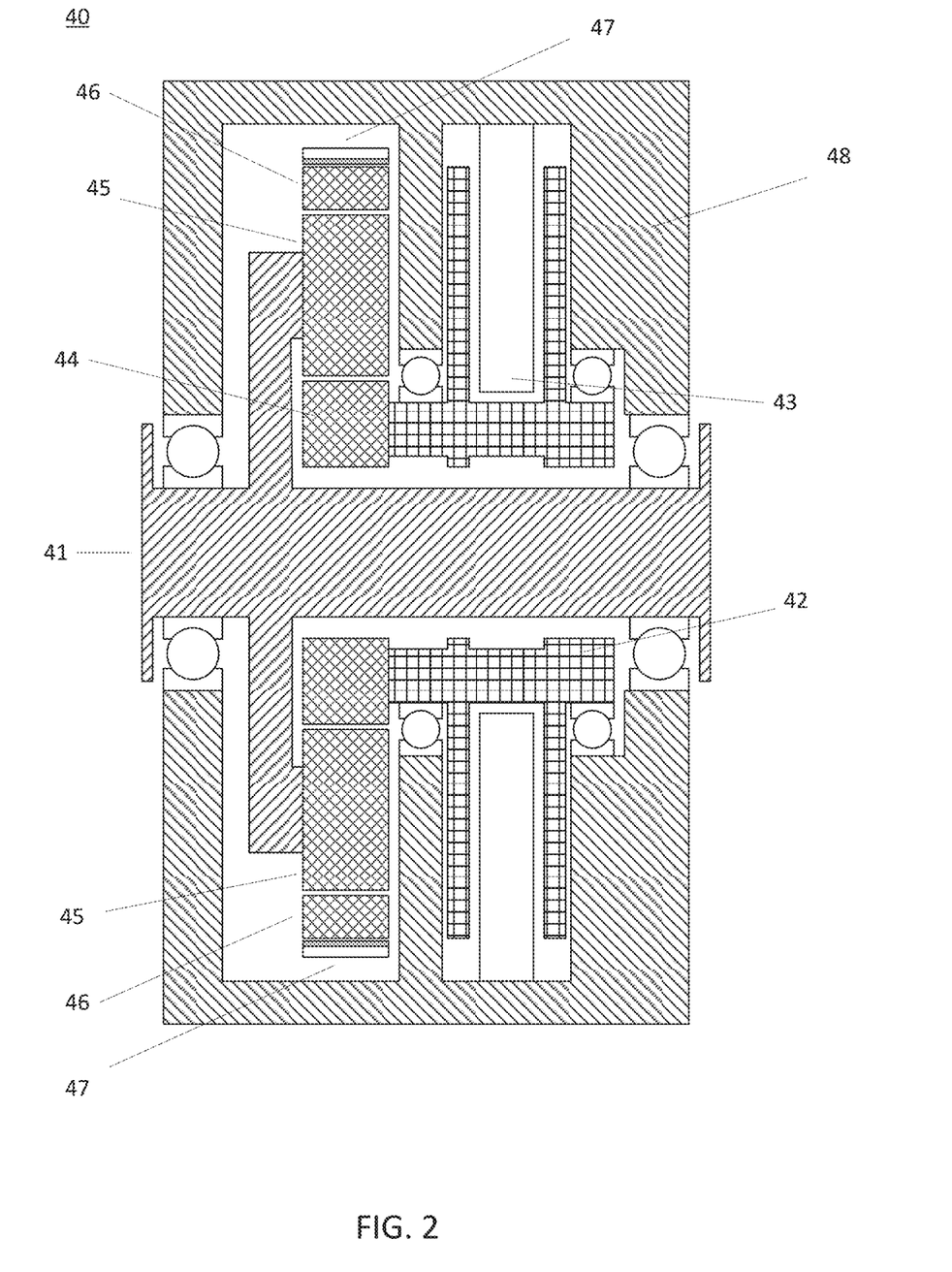
FIG. 2 illustrates a first embodiment for portions of the hybrid drive system of FIG. 1.

FIG. 2 illustrates a more detailed view of portions of the hybrid drive system of FIG. 1 in a first embodiment. The hybrid drive system includes an in-line hybrid drive assembly 40 including an electrical machine 40b and a planetary gear system 40a. The in-line hybrid drive assembly 40 includes or is connected to the shaft 41. The shaft 41 is an example rotating element connected to other rotating elements for the purpose of transferring torque. The rotating elements may include a crankshaft on the engine 20 or gearbox connected to the crankshaft on the engine 20. The rotating elements may include the propeller 10 or other load device. The shaft 41 is also connected the planetary gear system 40a. In one example, the shaft 41 is directly coupled to the carrier for the planet gears. In another example, the shaft 41 is directly coupled to one or more of the sun or rim gears. In still another example, the planetary gearset incorporates multiple reduction sections, passing through two or more planetary stages to achieve the final gear ratio.

FIG. 2 illustrates that the electrical machine 40b includes a rotor 42 within the electrical machine, such as a motor/generator, connected to the sun gear 44 and in magnetic communication with the stator 43 of the electrical machine. The stator 43 within the electrical machine 40b is in magnetic communication with the rotor 42 and connected to the housing 48 of the in-line hybrid drive system. The sun gear 44 is connected to the rotor 42 of the electrical machine, rotating at the same speed as the rotor 42 of the electrical machine and selectively transferring torque from the rotor 42 of the electrical machine to the rotating element or shaft 41 through the ring gear 46 and the planet gears 45. One or more planet gears 45, which may be referred to as satellite gears, are configured to mesh with the sun gear 44 and the ring gear 46 and rotationally constrained by a carrier connected to the rotating element or shaft 41. A ring gear 46 is located at a larger radius than the planet gears 45 and configured to mesh gear teeth with the planet gears 45.

A band 47 encompasses the ring gear 46 and is connected to the housing 48 for the purpose of selectively holding the ring gear from rotating relative to the housing 48. The band 47 may be activated by an electromagnetic solenoid, hydraulic pressure, mechanical lever, or a combination of these devices. The housing 48 is for the in-line hybrid drive system, configured to remain stationary relative to surroundings, contain lubricating oil, and to protect the internal rotating elements from contact or exposure to undesirable agents, such as corrosive compounds.

When the band 47 is activated, the rotation speed of the rotor 42 within the electrical machine 40b is linked to the rotation of the shaft 41 by a fixed ratio and the torque applied to the shaft 41 by the electrical machine 40b is a fixed ratio of the torque generated in the electrical machine 40b with some losses within the planetary gear system 40a. When the band 47 is deactivated, the rotation speed of the rotor 42 within the electrical machine is not related to the speed of the shaft 41 and may be stationary. That is, the electrical machine may rotate independently of the shaft 41 and not provide any significant torque to the shaft 41. The term significant torque may be defined in one example as a torque significant to rotate the shaft 41 a certain number of radial degrees (e.g. 10 degree or 180 degrees). The term significant torque may be defined in one example as a torque significant to rotate the shaft 41 for a predetermined amount of time. In addition, when the band 47 is deactivated, the torque applied to the shaft 41 by the electrical machine 40b is zero or near zero.

Figure 3:
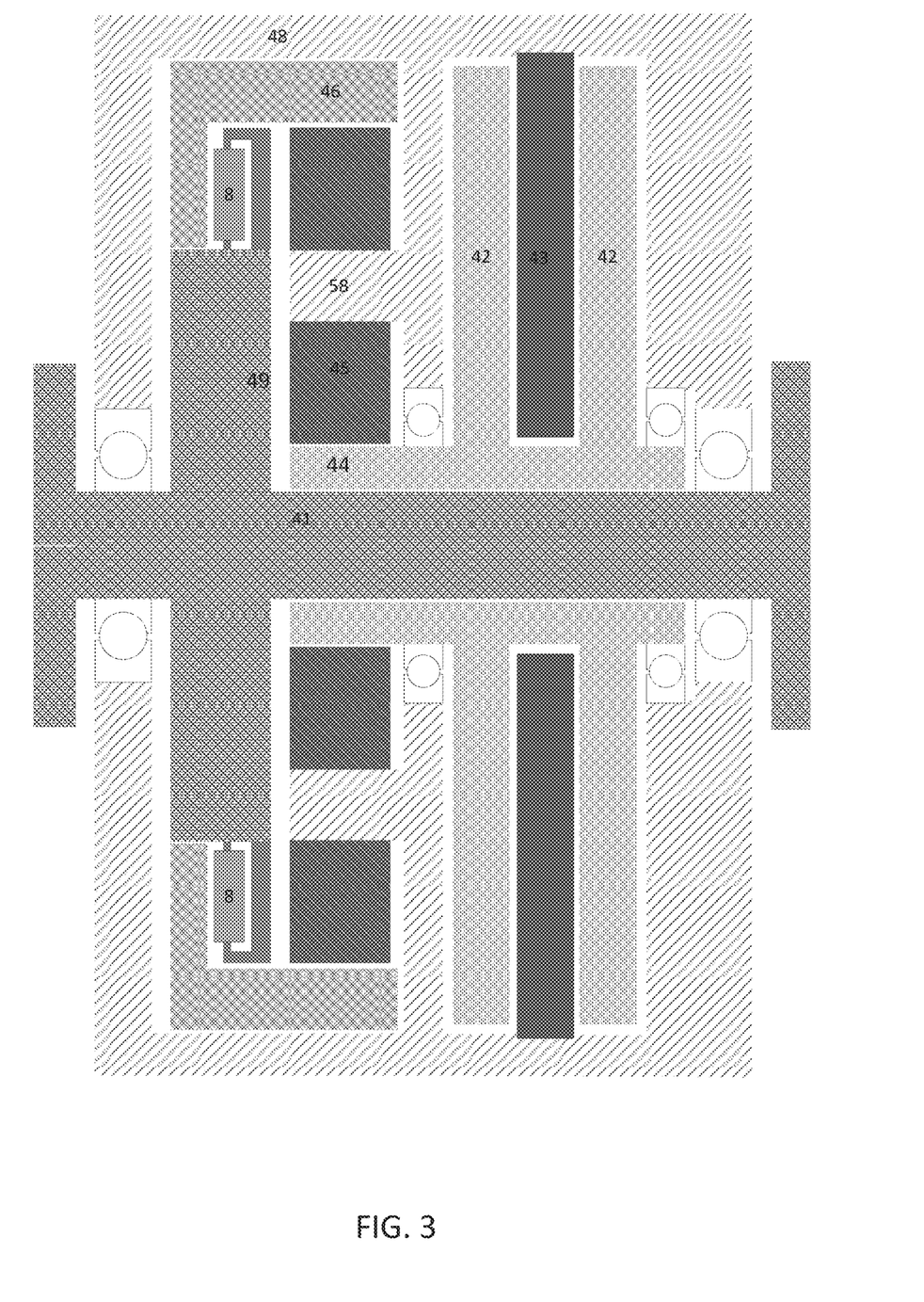
FIG. 3 illustrates a second embodiment for portions of the hybrid drive system of FIG. 1.
Figure 4:
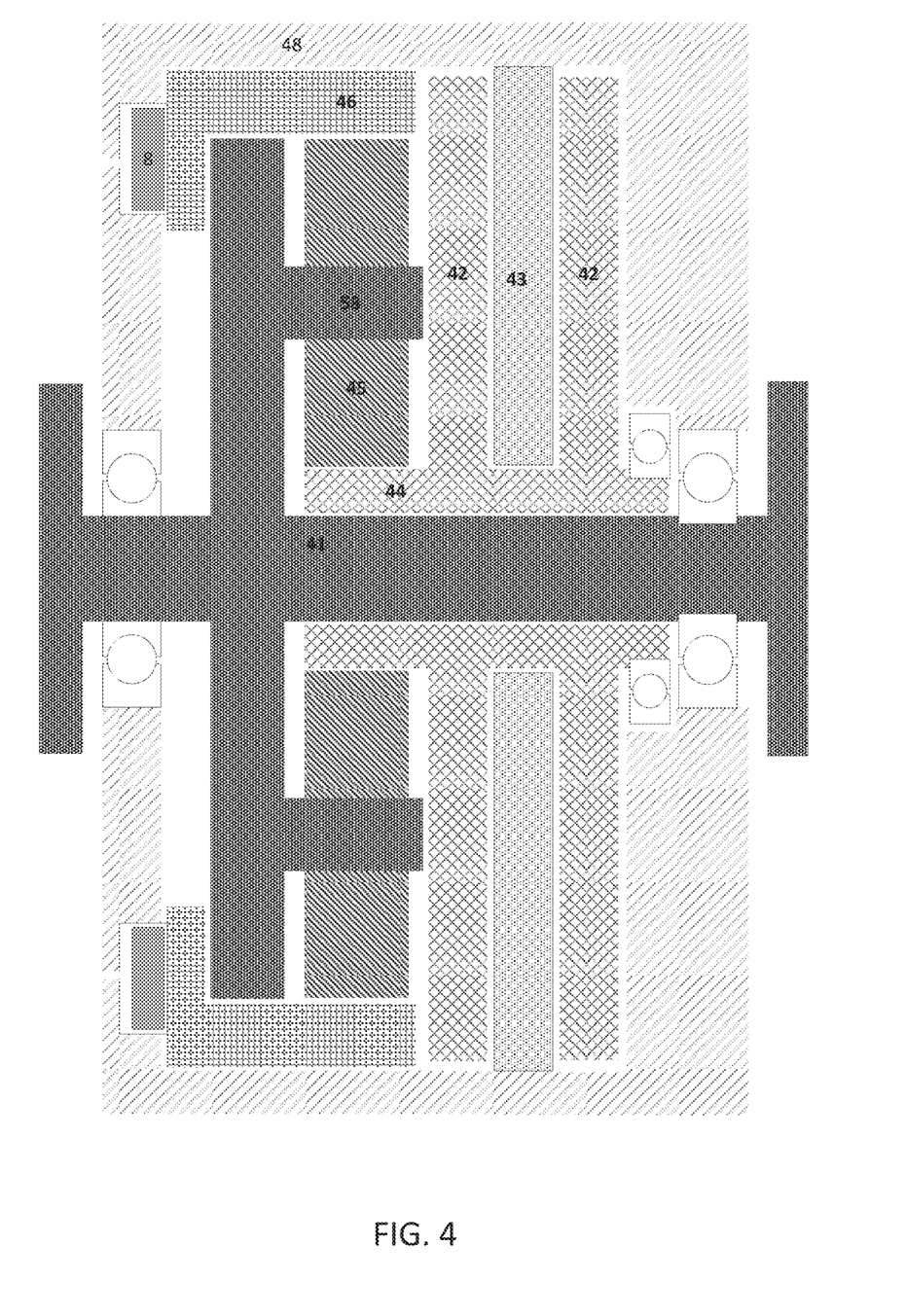
FIG. 4 illustrates a third embodiment for portions of the hybrid drive system of FIG. 1.

FIGS. 3 and 4 illustrate alternative implementation of a clutch in various positions of the planetary gear system 40a. One skilled in the art of development of planetary gearboxes may extend the concept to other configurations of planetary gearboxes.

FIG. 3 illustrates a second embodiment for portions of the hybrid drive system of FIG. 1. The hybrid drive system may include a drive shaft 41, a rotor 42, a stator 43, a sun gear 44, a planet gear 45, a ring gear 46, a housing 48, a drive gear 49, a planet carrier 58, and a clutch 8. Additional, different or fewer components may be included.

The drive shaft 41 is connected to the transfer gear 21, as shown in FIG. 1. The drive shaft 41 may rotate within the sun gear 44, for example, the drive shaft 41 may rotate within the sun gear 44 without being meshed together. The drive shaft 41 may be coupled to drive gear 49 that is brought in and out of a driving relationship to the ring gear 46 by the clutch 8. The clutch 8 may include one or more clutch discs that spline to a first member and surround a center plate that spline to a second member. For example, in clutch 8 the first member may be coupled to the drive gear and the second member may be coupled to the ring gear 46. The discs of the clutch 8 may be compressed by a piston in a housing with a cavity that can be filled by pressurized oil to move the piston and compress the discs plates so the assembly including the first member and the second member rotates together. The piston may be controlled remotely by another device. Other configurations are possible.

When the clutch 8 is not engaged, the drive gear 49 only spins and the electric machine portion of the hybrid drive system is in neutral. In other words, the shaft 41 has no impact on the electric machine. That is, the rotor 42 does not turn when the clutch 8 is not engaged.

The ring gear 46 meshes with the planet gear 45. When the clutch 8 is engaged and causes the drive gear 49 to engage or otherwise cause the ring gear 46 to rotate, the ring gear 46 causes the planet gear 45 to rotate. The planet carrier 58 is integrated with or coupled to the housing 48. Thus, the planet carrier 58 is stationary. Because the planet carrier 58 is stationary, the center of the planet gears 45 do not move, but the planet gears 45 spin in place. The planet gears 45 rotate the sun gear 44.

The sun gear 44 is integrated with or coupled to the rotor 42 (rotor shaft). The planetary gear system 40a acts as the prime mover for the rotor 42. In one example, the rotor includes an exciter armature along with the field coil assembly. The stator 43 includes an exciter field assembly and exciter armature windings. As the exciter armature windings rotate within the stator assembly, one or more currents are generated in the exciter armature windings. Two or more wires or other electrically conductive connections connect the exciter armature windings to the field coil assembly. The current from the exciter armature windings supplies current to the field coil assembly. In one example, the stator includes the armature with windings and the exciter includes permanent magnets. As the field coil assembly rotates within the stator assembly, currents are generator in the armature. The current from the windings is carried by an electrical connection to a load. Other implementations for the electric machine 40b may be used.

FIG. 4 illustrates a third embodiment for portions of the hybrid drive system of FIG. 1. The hybrid drive system may include a drive shaft 41, a rotor 42, a stator 43, a sun gear 44, a planet gear 45, a ring gear 46, a housing 48, a drive gear 49, a planet carrier 58, and the clutch 8. The clutch 8, in the third embodiment, connects the ring gear 46 to the housing 48. Additional, different or fewer components may be included.

The drive shaft 41 is connected to the transfer gear 21, as shown in FIG. 1. The drive shaft 41 may rotate within the sun gear 44, for example, the drive shaft 41 may rotate within the sun gear 44 without being meshed together. The drive shaft 41 may be coupled to the planet carrier 58.

As described above the clutch 8 may include one or more plates brought into meshing or friction contact by a piston. The clutch 8 may be a band type clutch. When the clutch 8 allows the ring gear 46 to move relative to the housing 48 (i.e., the clutch 8 is disengaged), then the planet carrier 58, as it rotates, causes the planet gears 45 to rotate about the axis of the drive shaft 41. When the clutch 8 locks the ring gear 46 (e.g., rim) to the housing (i.e., the clutch 8 is engaged), then the planet carrier 58 causes the planet gears 45 to spin and rotate the sun gear 44.

The sun gear 44 is integrated with or coupled to the rotor 42 (rotor shaft). The planetary gear system 40a acts as the prime mover for the rotor 42. Rotation off the sun gear 44 causes the electric machine 40b to generate a current carried by an electrical connection to a load.

Figure 5:
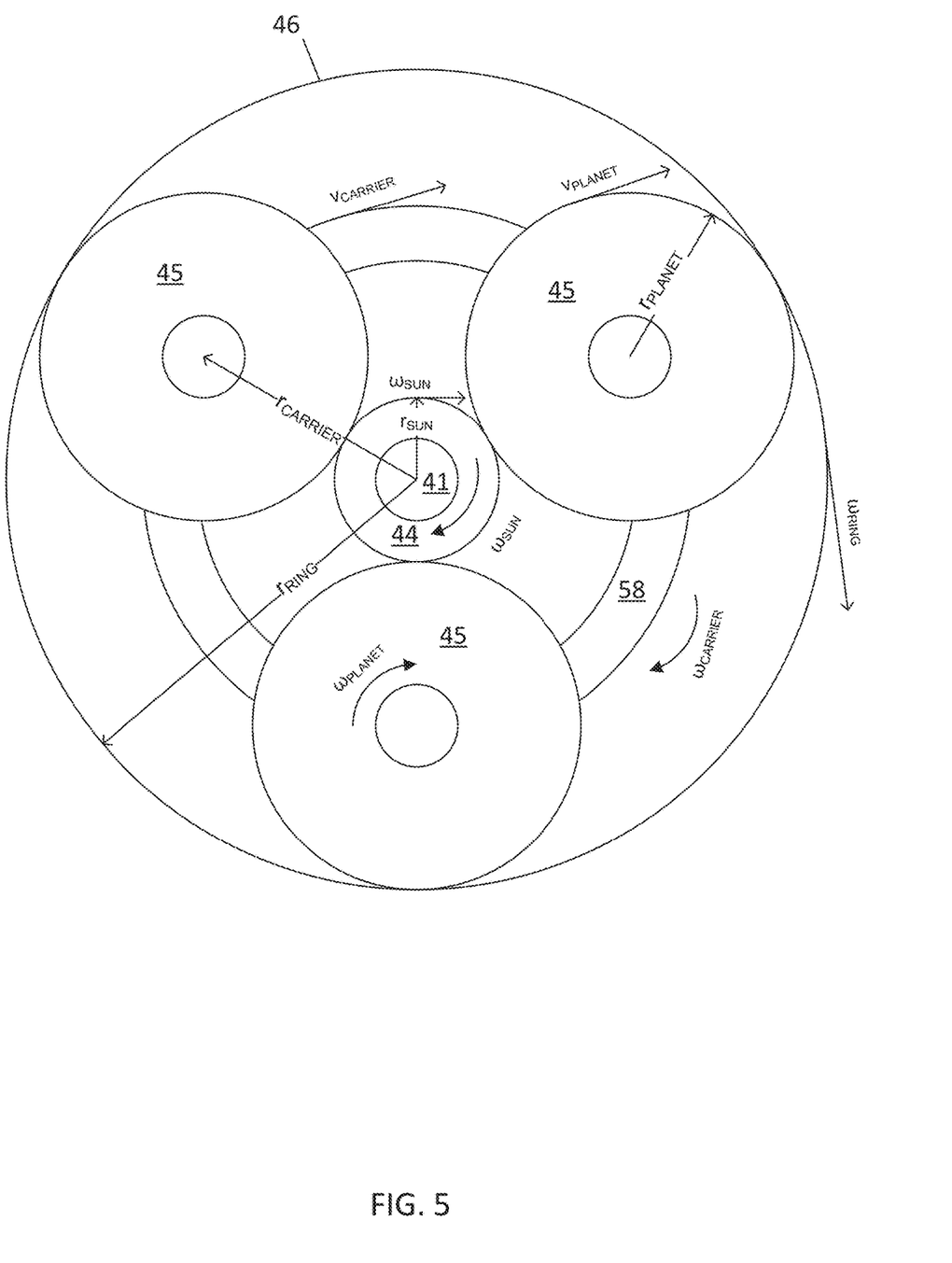
FIGS. 5 and 6 illustrate a planetary gear assembly of FIGS. 1 and 2.
Figure 6:
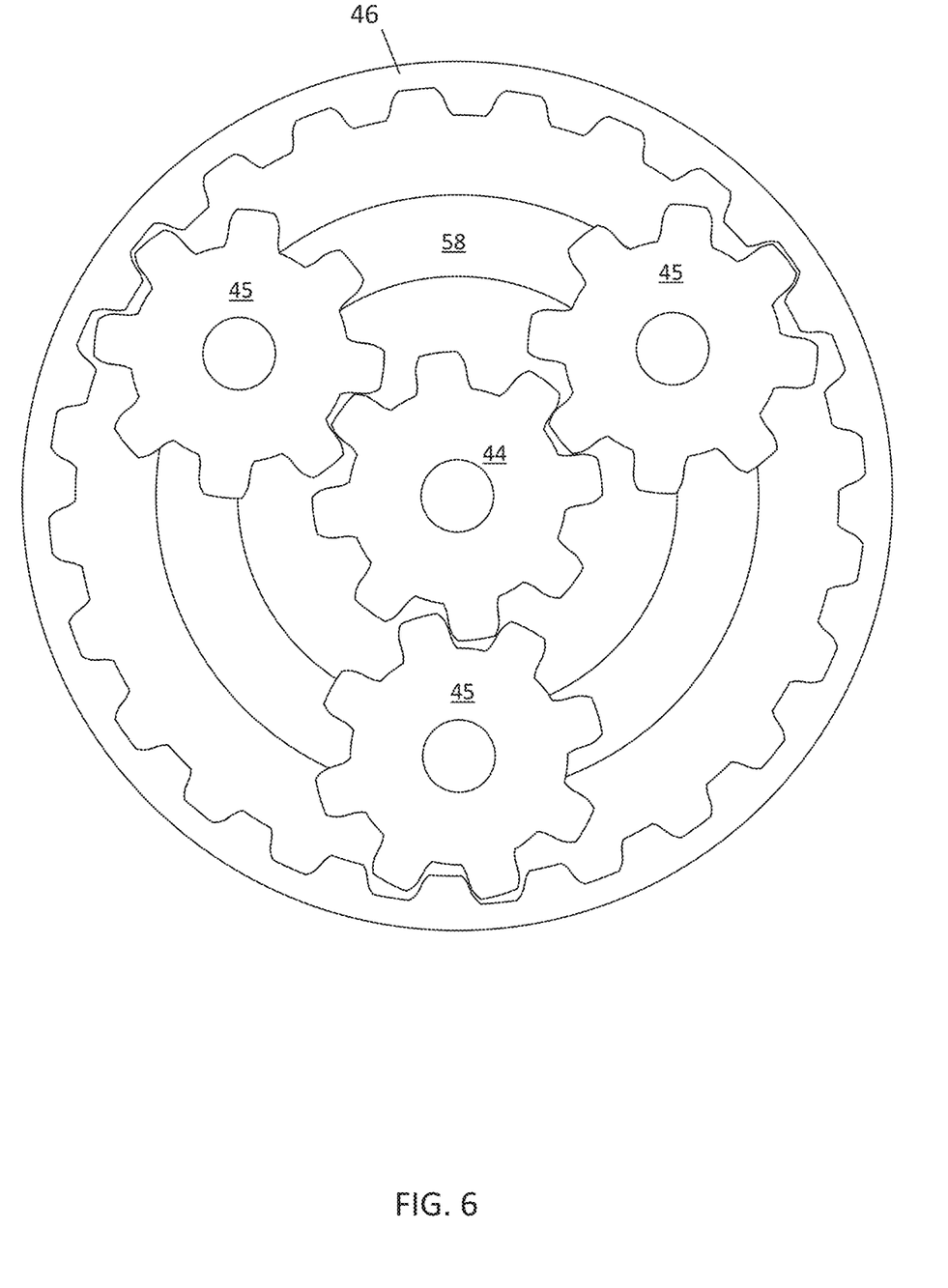

FIGS. 5 and 6 illustrate a planetary gear assembly of FIGS. 1-4. The planetary gear assembly includes a ring gear 46, planets 45, and a sun 44. The motor assembly includes a rotor 42, and stator 43. Additional, different, or fewer components may be included.

The planetary gear assembly includes one or more epicyclic gears. For example, planets 45 and sun 44 are examples of epicyclic gears. One of the epicyclic gears rotates around another of the epicyclic gears. For example, planets 45 rotate around the sun 44. The sun 44 may be a first epicyclic gear and one or more planets 45 may be a second epicyclic gear operative to mesh with the first epicyclic gear and move in relation to the first epicyclic to be carried around the first epicyclic gear. The planets 45 and sun 44 include gear teeth that mesh so that a circumferential edge of the planets 45 rotate at the same speed as the circumferential edge of the sun 44. The gear teeth ensure that there is no slip between the planets 45 and the sun 44.

The sun 44 and the planets 45 may rotate in different patterns. In a first example, the sun 44 may be driven and, in turn, drives the rotation of the planets 45. In a second example, the sun 44 is not driven and the planets 45 are driven (via the carrier 58) to rotate around the sun 44. In a third example, the sun 44 is driven and the carrier 58 of the planets 45 are driven in the same direction, such that the planets 45 rotate and the sum of the driven speed of the sun 44 and the speed of the carrier 58 of the planets 45 is the rotational speed of the planets 45. In a fourth example, the sun 44 is driven and the carrier 58 of the planets 45 are driven in the different directions, such that the planets 45 rotate and the different of the driven speed of the sun 44 and the speed of the carrier 58 of the planets 45 in the rotational speed of the planets 45. In each of these examples, a point on the circumferential edge of any of the planets 45 traces a roulette shape or an epicycloid curve.

The ring gear 46 may be operative to mesh with the one or more planets 45. The ring gear 46 includes gear teeth that mesh so that a circumferential edge of the planets 45 rotate at the same speed as the inner edge of the ring gear 46. The gear teeth ensure that there is no slip between the planets 14 and the ring gear 46.

Figure 7:
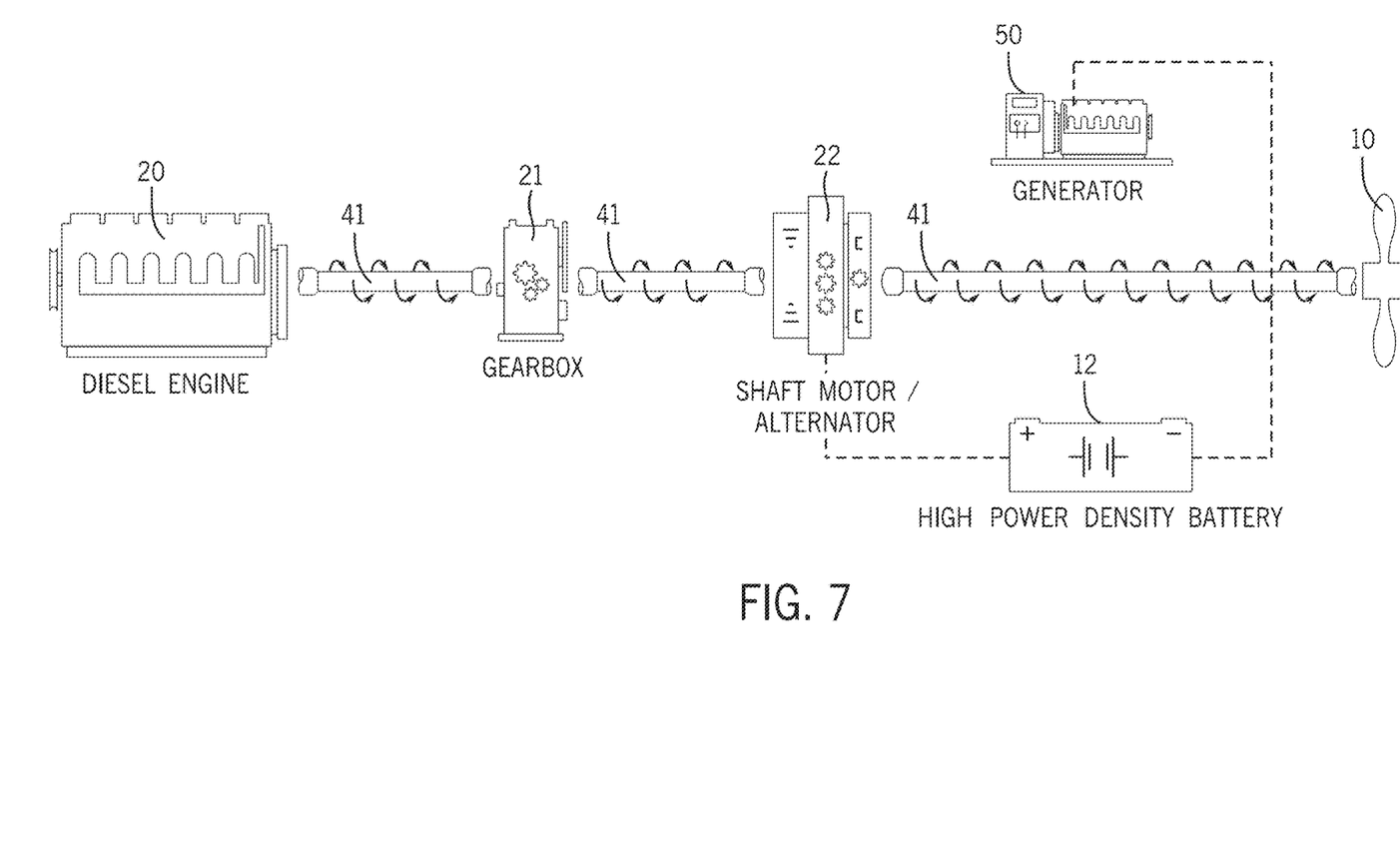
FIGS. 7 and 8 illustrate a hybrid drive system.
Figure 8:
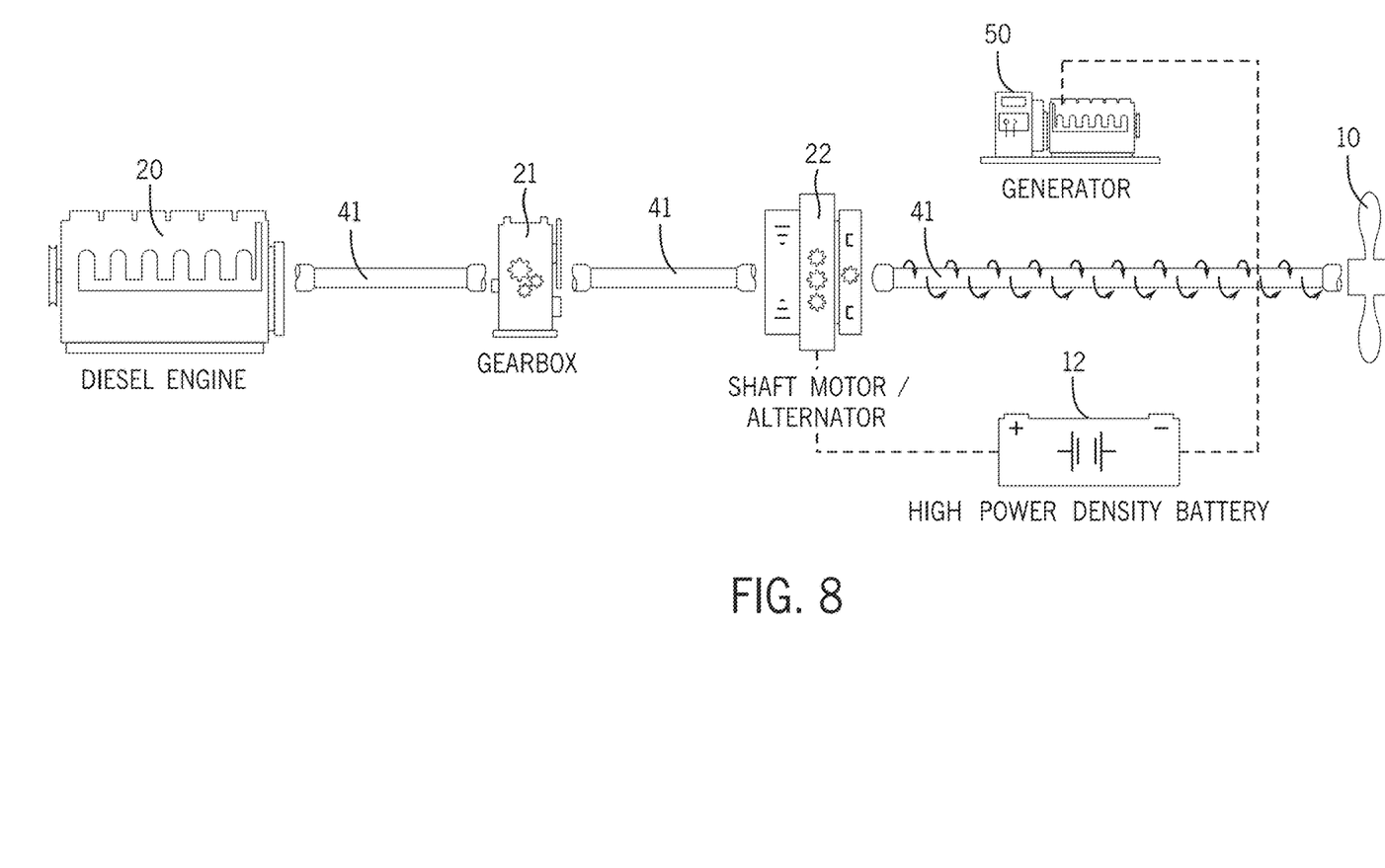

FIGS. 7 and 8 illustrate a hybrid drive system including a single shaft 41 that is driven by the engine 20 and sometimes also by the motor of motor/alternator 22. At other times, the shaft 41 rotates the alternator of motor/alternator 22. The motor/alternator 22 may also include the planetary gear system and clutch described herein. Optionally, additionally a generator 50 may be included to assist in the recharging of battery 12. For example, during anchoring or at shore, a separate system (e.g., harbor genset or shore power) may be used if there is no need to start the propulsion engines when at anchor or shore. Hotel loads 60, such as other electrical devices on the marine vessel including lights, refrigerators, televisions, stereo systems, or other devices, are relatively small compared to propulsion engine output and can be handled by a harbor genset or a connection to shore power.

FIG. 7 illustrates a propulsion mode in which the engine 20 is driving the shaft 41 and the propeller 10 and the alternator of the motor/alternator 22 is charging the battery 12. That is, during the propulsion mode the engine 20 turns the propeller 10 and also turns the alternator, which charges the battery 12. The clutch 8 may also be placed into a predetermined configuration according to the propulsion mode. The clutch 8 may be engaged to connect the shaft 41 to a drive train to the alternator so that the engine 20 turns the alternator. A control circuit or other controller may engage the clutch 8 in response to the propulsion mode being selected. For example, the control circuit may activate a solenoid or piston for engaging the clutch 8.

FIG. 8 illustrate an electric mode in which the motor of the motor/alternator 22 is being powered by the battery 12 and driving the shaft 41 and the propeller 10. During the electric mode, the engine 20 does not drive the shaft 41 or the propeller 10. The clutch 8 may also be placed into a predetermined configuration according to the electric mode. The clutch 8 may be disengaged to disconnect the shaft 41 to from the alternator moves freely with respect to the shaft 41. The control circuit or other controller may disengage the clutch 8 in response to the electric mode being selected. For example, the control circuit may activate a solenoid or piston for disengaging the clutch 8.

In some examples, the control circuit or controller may also be configured to test the battery 12. The control circuit may be electrically connected to the battery 12 (e.g., in parallel with the motor off the motor/alternator 22). The control circuit may place a load on the battery 12. An example load may include a resistor of a set resistance. The control circuit may monitor the voltage and/or current through the set resistance. In some examples, a measured current value is compared to one or more thresholds to determine the battery level of the battery 12.

The control circuit may compare a charge of the battery (e.g., battery level) to a predetermined charge level to determine whether the battery has sufficient charge to turn the motor and/or enter the electric mode. When the charge of the battery exceeds the predetermined charge, the control circuit or controller activates the electric drive mode. When the charge of the battery does not exceed the predetermined charge, the control circuit or controller does not activate the electric drive mode.

Figure 9:
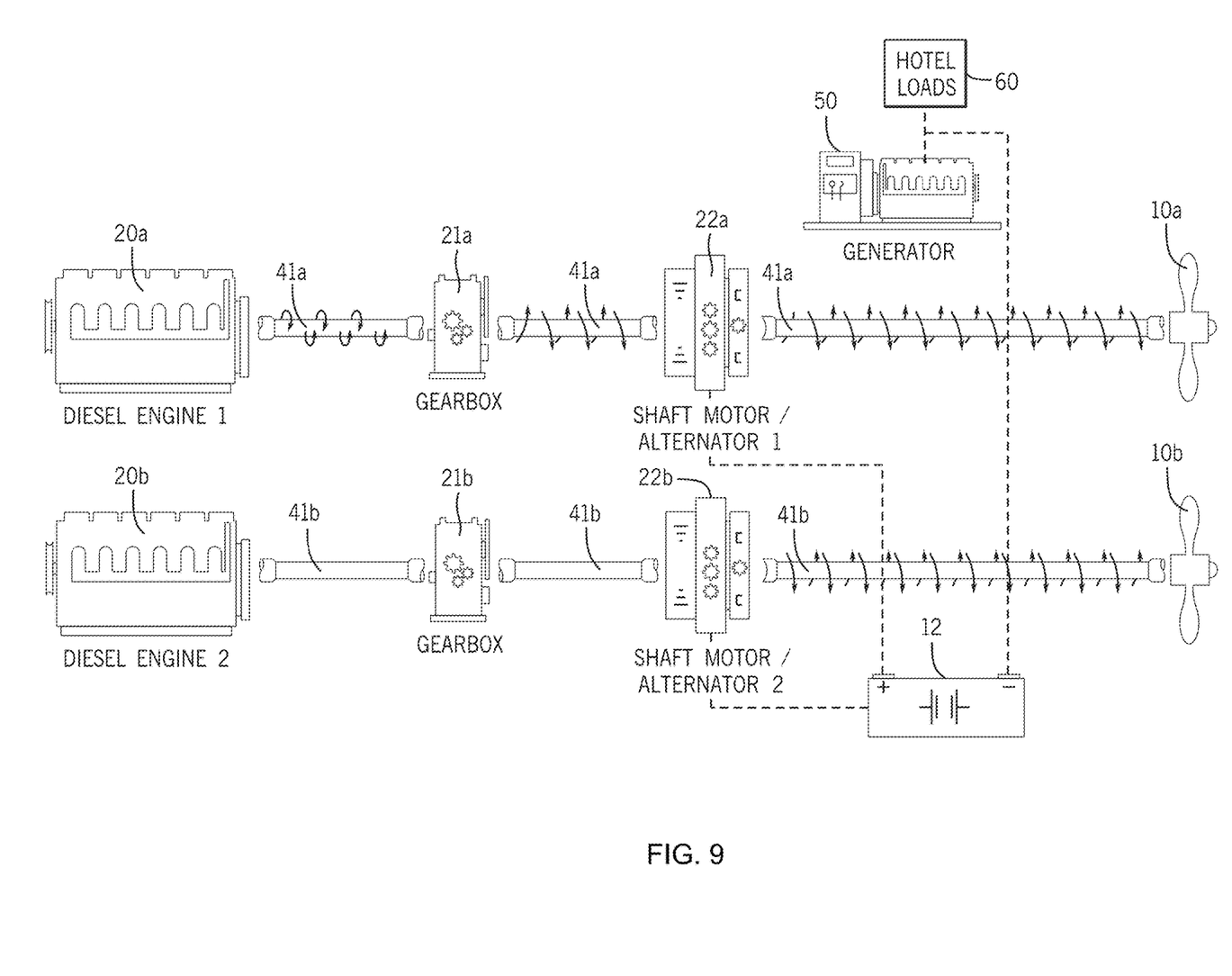
FIG. 9 illustrates a hybrid drive system including two drive trains.

FIG. 9 illustrates a hybrid drive system including two drive trains. In this example, each drive train includes a shaft 41 connected to an engine and motor/alternator 22 and a propeller 10. Specifically, the first drive train includes a first engine 20a that drives the first drive shaft 41a connected to the first gearbox 21a, the first motor/alternator 22a, and the first propeller 10a. The second drive train includes a second engine 20b that drives the second drive shaft 41b connected to the second gearbox 21b, the second motor/alternator 22b, and the second propeller 10b.

The hybrid drive system with two drive trains may be utilized by marine vessels having multiple propellers. Any number of drive trains and propellers may be used. Multiple propellers may improve steering and reverse movement in the marine vessel.

A single battery 12 (or single battery bank) may be charged by both drive trains via motor/alternator 22. In addition, the motors of both motor/alternators 22 may be powered by the same battery 12.

The dual drive trains may operate in different or the same modes of operation. Both drive trains may operate in the electric mode and certain instances and both drive trains may operate in the propulsion mode in certain instances. In some instances one drive train may operate in the electric mode and one drive train may operate in the propulsion mode. As shown in FIG. 9, the first drive train is in the propulsion mode—the first engine 20a rotates the first drive shaft 41a to turn the first propeller 10a. The first drive train may also turn the alternator of the motor/alternator 22 for charging the battery 12 and/or providing power to the hotel loads 60. In some examples, a supplemental generator 50 provides power to the hotel loads 60 and/or to assist in charging the battery 12. The second drive train is in the electric mode—the motor of the second motor/alternator 22b is powered by the battery 12 to rotate the second propeller 10b and provide power to the hotel loads 60.

Figure 10:
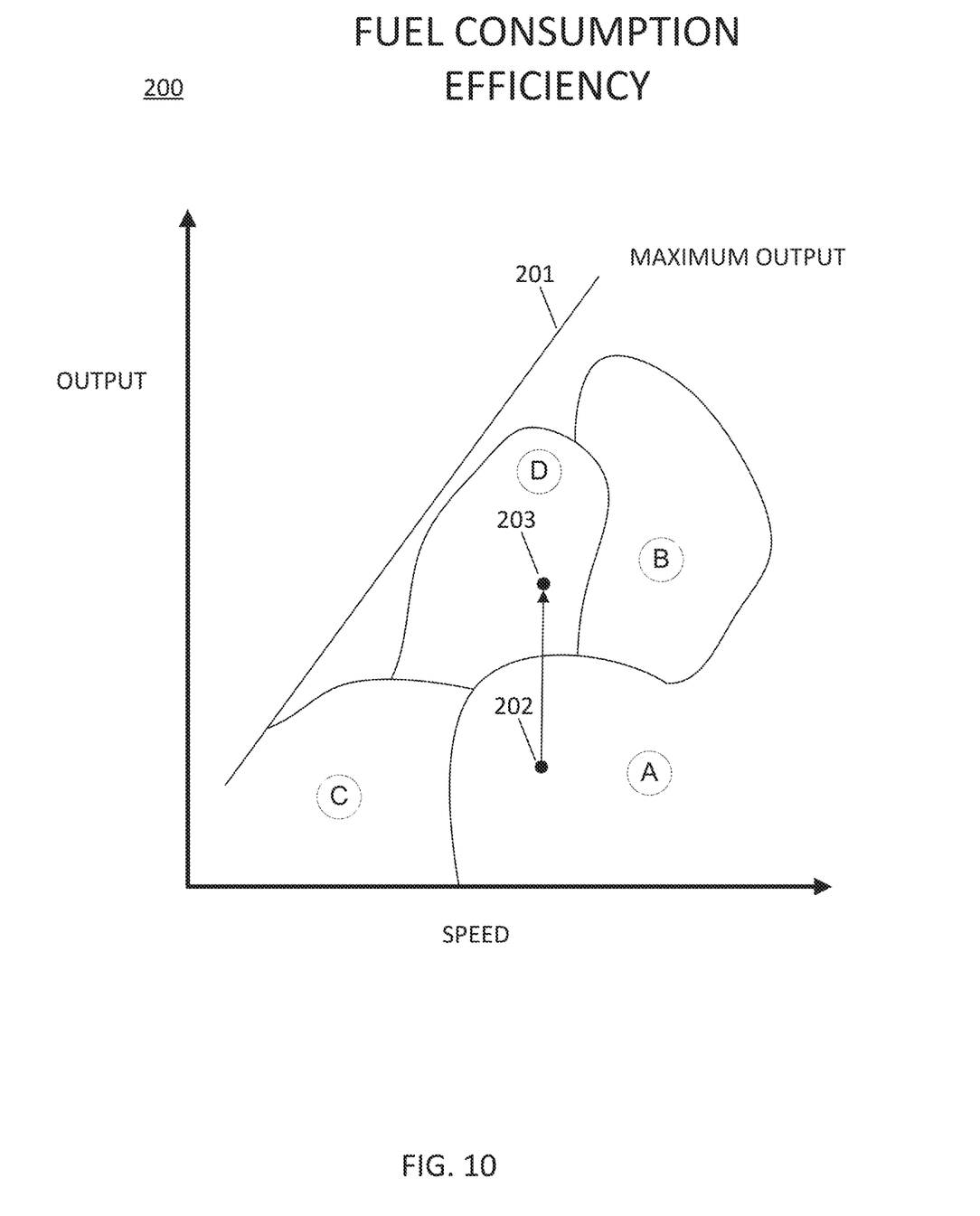
FIG. 10 illustrates an example fuel consumption efficiency chart.

FIG. 10 illustrates an example fuel consumption efficiency chart 200. The fuel consumption efficiency chart 200 illustrates regions of various fuel efficiency at operating points of the engine. An operating point is shown by the fuel consumption efficiency chart 200 as an output power or torque and speed pair (e.g., output X at speed Y corresponds to fuel consumption efficiency Z). The speed may be measured in revolutions per minute. The output may be measured in power or torque. For reference, a maximum output line 201 illustrates the highest output of the engine possible at any particular speed. For any given output and speed of the engine, the fuel consumption efficiency chart 200 shows a fuel consumption region that the engine is operating in. The regions are illustrated and labeled A, B, C and D. As one example, the highest efficiency may be in region D and the lowest efficiency may be in region A. Fuel efficiency may be measured in grams per kilowatt-hour.

The fuel consumption efficiency chart 200 illustrates the excess power available to charge the battery 12 when the drive system operates in the propulsion mode. When the engine operates at a selected speed for the propeller 10 (e.g., the rotational speed selected by the user to turn the propeller 10 and propel the marine vessel at the desired velocity) under the load of the marine vessel, the engine 20 operates at initial point 202. The initial point 202 is in efficiency region A, the lowest efficiency region of the engine 20. However, because the motor/alternator 22 is also driven by the engine 20, additional load is placed on the engine 20, moving the operating point from initial point 202 to hybrid point 203. The hybrid point 203, representing the combined load of the motor/alternator 22 and the propeller 10, is in efficiency region D, the highest efficiency region of the engine 20. Therefore, the hybrid operation of the engine (i.e., placing additional load on the engine to charge the battery) improves the fuel consumption efficiency of the drive system.

Figure 11:
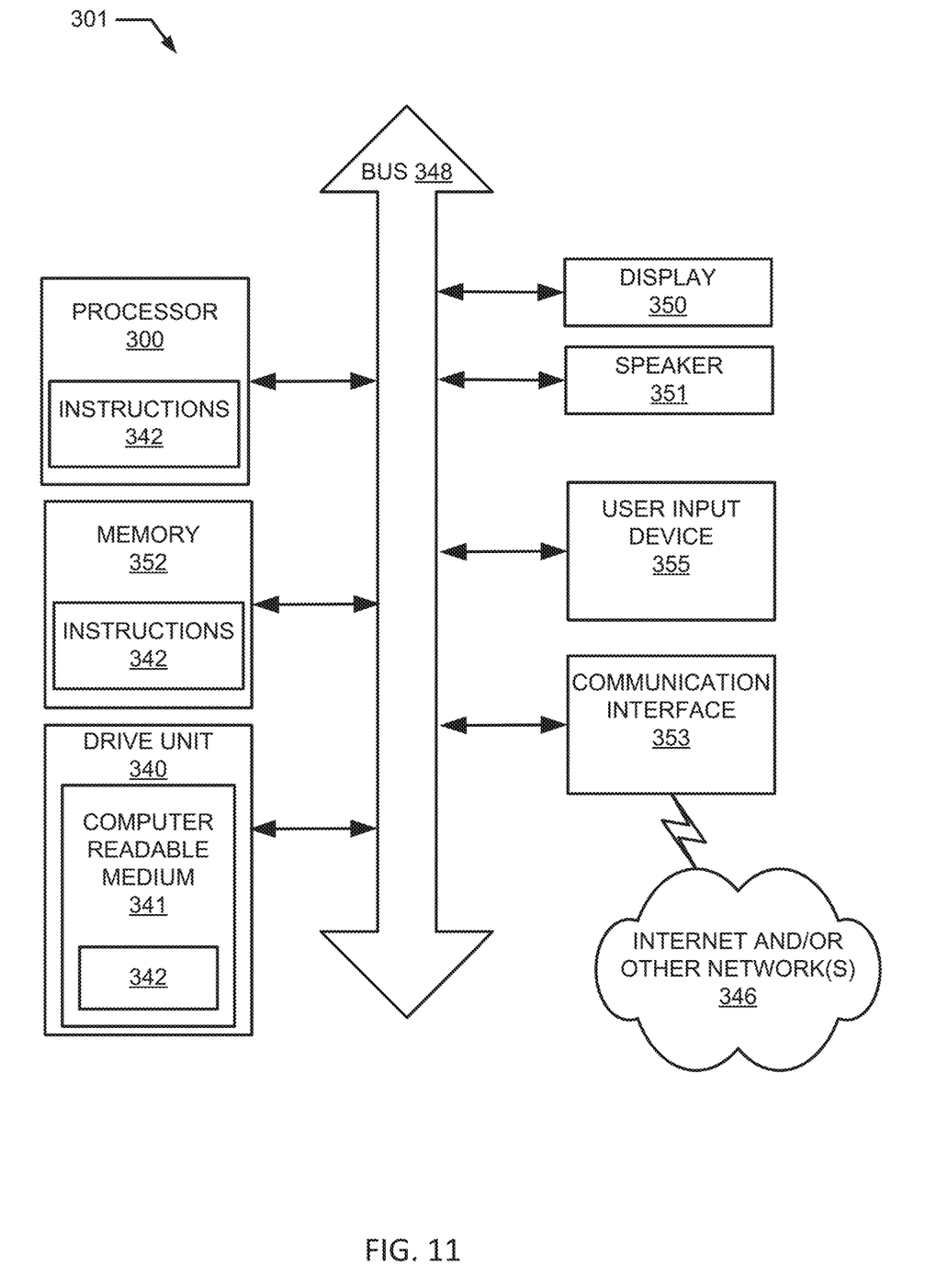
FIG. 11 illustrates an example controller for the hybrid drive system.

FIG. 11 illustrates an example controller 400 for the hybrid propulsion system. The controller 400 may include a processor 300, a memory 352, and a communication interface 353 for interfacing with devices or to the internet and/or other networks 346. In addition to the communication interface 353, a sensor interface may be configured to receive data describing the operation of the hybrid propulsion system from one or more sensors including speed sensors for the rotational speed of the shaft 41 and/or propeller or electrical sensors for the battery 12 or output of the alternator. The components of the control system 400 may communicate using bus 348. The control system 400 may be connected to a workstation or another external device (e.g., control panel) and/or a database for receiving user inputs, system characteristics, and any of the values described herein.

Optionally, the control system 400 may include an input device 355 and/or a sensing circuit in communication with any of the sensors. The sensing circuit receives sensor measurements from as described above. The input device 355 may include the switch 150, a touchscreen coupled to or integrated with the mirror, a keyboard, a microphone for voice inputs, a camera for gesture inputs, and/or another mechanism.

Optionally, the control system 400 may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be combined with the user input device 355. The display 350 may display information entered through the input device 355.

Alternatively, the display 350 may indicate a status of the drive system. The status of the drive system may be engine propulsion mode or electric drive mode. The status of the drive system may indicate the battery level. The status of the drive system may indicate whether one or more clutches are engaged or disengaged. The status of the drive system may indicate a configuration of the planetary gear system (e.g., a drive train that is activated through the planetary gear system). Any off this status information or other indicators may be alternatively or additionally provided audibly through the speaker 351.

Figure 12:
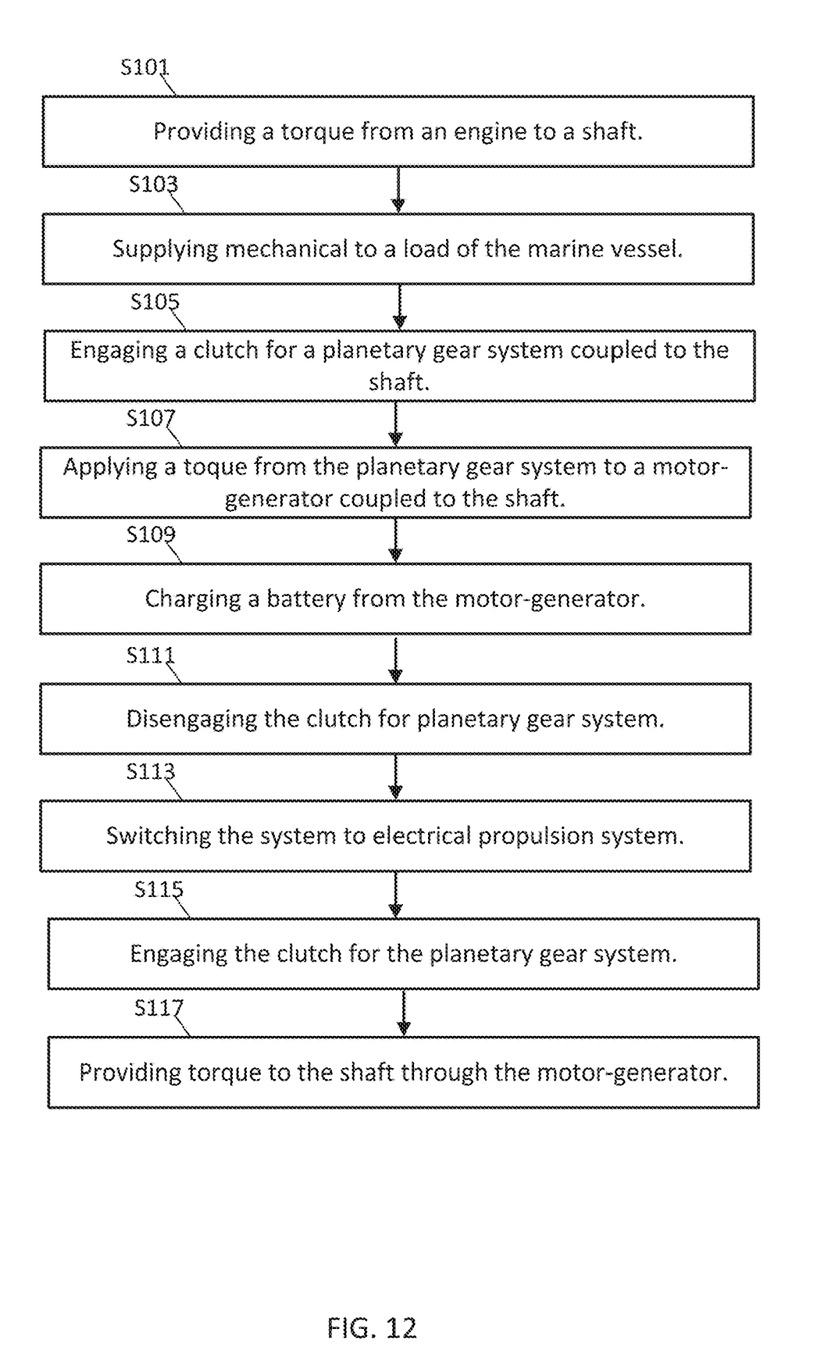
FIG. 12 illustrates a flow chart for the controller of FIG. 11.

FIG. 12 illustrates a flow chart for the control system 400. The acts of the flow chart may be performed by any combination of the control system 400, the network device or the server. Portions of one or more acts may be performed by the appliance. Additional, different of fewer acts may be included.

At act S101, the controller 400 (e.g., through processor 300) causes the in-line hybrid drive assembly 40 to provide a torque from an engine to a shaft. The controller 400 may provide an engine command to cause the engine to provide the torque to the shaft. For example, the controller 400 may send a command to the engine to start or a command that sets an operating speed for the engine to rotate the shaft. The engine drives the shaft in response to the command from the controller 400. The command for the engine may be generated in response to a user input from the user input device 355. That is, the user may enter instructions to start the engine, set an operating speed, or set an operating torque.

At act S103, the in-line hybrid drive assembly 40 supplies, from the shaft, mechanical power to a load of a marine vessel. The load of the marine vessel may include a propeller for pushing the marine vessel through water. The load off the marine vessel may include electrical loads onboard the marine vessel. Indirectly, the controller 400 (e.g., through processor 300) may cause the mechanical power to be provided to the load of the marine vessel.

At act S105, the controller 400 (e.g., through processor 300) causes the in-line hybrid drive assembly 40 to engage a first clutch for a planetary gear system coupled to the shaft. The controller 400 may generate a first clutch command to activate an electromagnetic solenoid, a hydraulic pump, a mechanical lever, or a combination of these devices that causes the first clutch to engage and drive at least one gear of the planetary gear system.

At act S107, the controller 400 (e.g., through processor 300) causes the in-line hybrid drive assembly 40 to, in response to the engaged first clutch, to apply a torque from the planetary gear system to a motor-generator coupled to the shaft. For example, through the first clutch command described in act S105, the controller 400 causes the torque to be applied to the motor-generator.

At act S109, the controller 400 (e.g., through processor 300) causes the in-line hybrid drive assembly 40 to charge a battery from the alternator of the motor-generator. The controller 400 may connect the battery to the alternator of the motor-generator when the first clutch is engaged to couple the planetary gear system to the motor-generator.

At act S111, the controller 400 (e.g., through processor 300) causes the in-line hybrid drive assembly 40 to disengage the first clutch for the planetary gear system. The controller 400 may generate another first clutch command to deactivate an electromagnetic solenoid, reverse the flow of hydraulic fluid using the hydraulic pump, actuate a mechanical lever, or operate a combination of these devices that causes the first clutch to disengage and be decoupled from at least one gear of the planetary gear system.

At act S113, the controller 400 (e.g., through processor 300) causes the in-line hybrid drive assembly 40 to switch to electrical propulsion, including operation of the motor-generator through stored electrical power from the battery. The controller 400 may activate an electrical switch that connects the battery to the motor of the motor-generator.

At act S115, the controller 400 (e.g., through processor 300) causes the in-line hybrid drive assembly 40 to engage a second clutch for the planetary gear system. The engagement of the second clutch causes the in-line hybrid drive assembly 40 to place the transfer gear of the engine in neutral. Thus, the engine is no longer mechanically coupled to the motor-generator.

At act S117, the controller 400 (e.g., through processor 300) causes the in-line hybrid drive assembly 40 to provide torque to the shaft through the motor-generator. For example, the battery provides a current to the motor of the motor-generator which causes the motor to rotate and transfer torque to the shaft, which rotates the propeller and/or provides electrical power to one or more loads of the marine vessel.

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, memory 298 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

What is claimed is:

1. A hybrid propulsion system for a marine vessel, the hybrid propulsion system comprising:
    a shaft coupled to a propeller;
    a planetary gear system configured to operate in a first configuration and a second configuration; and
    a motor-generator configured to selectively rotate with and provide torque to the shaft through the planetary gear system in the first configuration and to rotate independently from the shaft in the second configuration,
    wherein the shaft extends from the propeller through the planetary gear system and the motor-generator to a torque producing device for the marine vessel.

2. The hybrid propulsion system of claim 1, wherein the planetary gear system includes a clutch, wherein the clutch is engaged for the first configuration and the clutch is disengaged for the second configuration.

3. The hybrid propulsion system of claim 2, wherein the clutch includes a plurality of rotating double-sided sintered discs that spline to a hub.

4. The hybrid propulsion system of claim 3, wherein the clutch includes a piston movable in a housing which has a cavity that selectively filled by pressurized oil to move the piston.

5. The hybrid propulsion system of claim 4, wherein the piston compresses the sintered discs to engage the clutch.

6. The hybrid propulsion system of claim 2, wherein the planetary gear system includes a sun gear, a plurality of planet gears, a planet carrier, and a ring gear.

7. The hybrid propulsion system of claim 6, wherein a rotor of the motor-generator is coupled to the sun gear.

8. The hybrid propulsion system of claim 6, wherein the ring gear is coupled to the shaft through the clutch.

9. The hybrid propulsion system of claim 6, wherein the planet carrier is in a fixed position.

10. The hybrid propulsion system of claim 6, wherein the ring gear rotates the sun gear through the plurality of planet gears.

11. The hybrid propulsion system of claim 6, wherein the ring gear is coupled to a housing through the clutch.

12. The hybrid propulsion system of claim 6, wherein the planet carrier rotates with the shaft to drive plurality of planet gears.

13. The hybrid propulsion system of claim 1, wherein the torque producing device includes an engine.

14. The hybrid propulsion system of claim 1, wherein the motor-generator is operable in a plurality of modes including an engine propulsion mode including battery charging and an electric drive mode wherein motor-generator drive the shaft.

15. A method for operation of a hybrid propulsion system, the method comprising:
    providing a torque from an engine to a shaft;
    supplying, from the shaft, mechanical power to a load of a marine vessel;
    engaging a clutch for a planetary gear system coupled to the shaft; and
    in response to the engaged clutch, connecting a motor-generator to the shaft through the planetary gear system to transfer torque between the shaft and motor generator.

16. The method of claim 15, wherein the shaft passes through a housing of the motor-generator and the planetary gear system.

17. The method of claim 15, further comprising:
    charging a battery from the motor-generator.

18. The method of claim 15, further comprising:
    operating the motor-generator using stored electrical power from a battery; and
    providing a torque from the motor-generator to a shaft.

19. The method of claim 15, wherein the load of a marine vessel includes a propeller.

20. A hybrid propulsion system for a marine vessel, the hybrid propulsion system comprising:
    a planetary gear system configured to operate in an engine propulsion configuration and an electric drive configuration; and
    a motor-generator configured to selectively rotate with an engine and charge at least one battery in the engine propulsion configuration and configured to provide torque for the marine vessel through the planetary gear system in the electric drive configuration.

* * * * *